US012130432B2

(12) United States Patent
Fujimoto et al.

(10) Patent No.: US 12,130,432 B2
(45) Date of Patent: Oct. 29, 2024

(54) HEAD-UP DISPLAY DEVICE

(71) Applicant: YAZAKI CORPORATION, Tokyo (JP)

(72) Inventors: Yusuke Fujimoto, Makinohara (JP); Akira Yamanaka, Makinohara (JP); Yuta Miyake, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/398,147

(22) Filed: Dec. 28, 2023

(65) Prior Publication Data
US 2024/0126079 A1 Apr. 18, 2024

Related U.S. Application Data

(63) Continuation of application No. PCT/JP2022/045850, filed on Dec. 13, 2022.

(30) Foreign Application Priority Data

Dec. 14, 2021 (JP) ................................. 2021-202512

(51) Int. Cl.
*G02B 27/01* (2006.01)
(52) U.S. Cl.
CPC .. *G02B 27/0149* (2013.01); *G02B 2027/0159* (2013.01)
(58) Field of Classification Search
CPC ................... G02B 27/0149; G02B 2027/0159

USPC ............................................................ 349/11
See application file for complete search history.

(56) References Cited

U.S. PATENT DOCUMENTS

2020/0241297 A1* 7/2020 Hatasako ............... B60K 35/53
2021/0271076 A1* 9/2021 Ono ..................... G02B 27/0093

FOREIGN PATENT DOCUMENTS

JP 6107380 B2 4/2017

OTHER PUBLICATIONS

International Search Report and Written Opinion of the International Search Report for PCT/JP2022/045850 dated Jan. 24, 2023.

* cited by examiner

*Primary Examiner* — Charles S Chang
(74) *Attorney, Agent, or Firm* — KENEALY VAIDYA LLP

(57) ABSTRACT

There is provided a head-up display device including an indicator that emits display light, a concave mirror that is rotatable about a rotation shaft and reflects the display light from the indicator to project a display image, a motor that has a shaft portion disposed coaxially with the rotation shaft of the concave mirror and rotates the shaft portion about an axis when energized, a connecting member that connects the shaft portion of the motor and the rotation shaft of the concave mirror and rotates the concave mirror at the same rotation angle as a rotation angle of the rotation shaft, and a control board that controls the motor. The control board controls rotation of the motor by half-step drive or micro-step drive.

6 Claims, 12 Drawing Sheets

HEAD-UP DISPLAY DEVICE

CROSS-REFERENCE TO RELATED APPLICATIONS

The present application is a continuation application of PCT/JP2022/045850 that claims priority to Japanese Patent Application No. 2021-202512 filed on Dec. 14, 2021, the entire content of which is incorporated herein by reference.

TECHNICAL FIELD

The present disclosure relates to a head-up display device.

BACKGROUND ART

In the related art, there is known a head-up display device that includes, in an opening formed in an upper face of an instrument panel, an indicator and a mirror that reflects an image displayed on the indicator toward a windshield (for example, see JP6107380B).

Here, the head-up display device described in JP6107380B includes a worm gear and changes a height of a virtual image by rotating the mirror in one direction or the other direction via the worm gear.

The head-up display device including the worm gear has a problem that a reduction ratio tends to be large and it is difficult to rotate the mirror at a high speed.

It is also conceivable to reduce the reduction ratio to realize high-speed movement, but in this case, the resolution during mirror rotation may be reduced, and the rotation operation may be unnatural.

In addition, it is conceivable to increase a motor energization amount to speed up the mirror rotation, but in this case, a driving noise may be large, and a user may find it bothersome during the mirror rotation.

SUMMARY OF INVENTION

The present disclosure provides a head-up display device capable of reducing a driving noise and enabling high-speed movement while suppressing a decrease in the resolution during mirror rotation.

A head-up display device according to the present disclosure includes: an indicator configured to emit display light; a mirror member rotatable about a rotation shaft and configured to reflect the display light from the indicator to project a display image; a motor having a shaft portion disposed coaxially with the rotation shaft of the mirror member and configured to rotate the shaft portion about an axis when energized; a connecting member configured to connect the shaft portion of the motor and the rotation shaft of the mirror member and rotate the mirror member at the same rotation angle as a rotation angle of the shaft portion; and a control unit configured to control the motor. The control unit controls rotation of the motor by half-step drive or micro-step drive.

According to the present disclosure, it is possible to provide a head-up display device capable of reducing a driving noise and enabling high-speed movement while suppressing a decrease in the resolution during mirror rotation.

DESCRIPTION OF EMBODIMENTS

Hereinafter, the present disclosure will be described with reference to a preferred embodiment. The present disclosure is not limited to the following embodiment, and can be appropriately modified without departing from the scope of the present disclosure. In addition, in the embodiment described below, although there are portions in which illustrations and descriptions of some configurations are omitted, it goes without saying that for details of omitted techniques, publicly known or well-known techniques are appropriately applied within a range that does not cause contradiction with contents described below.

Figure 1:
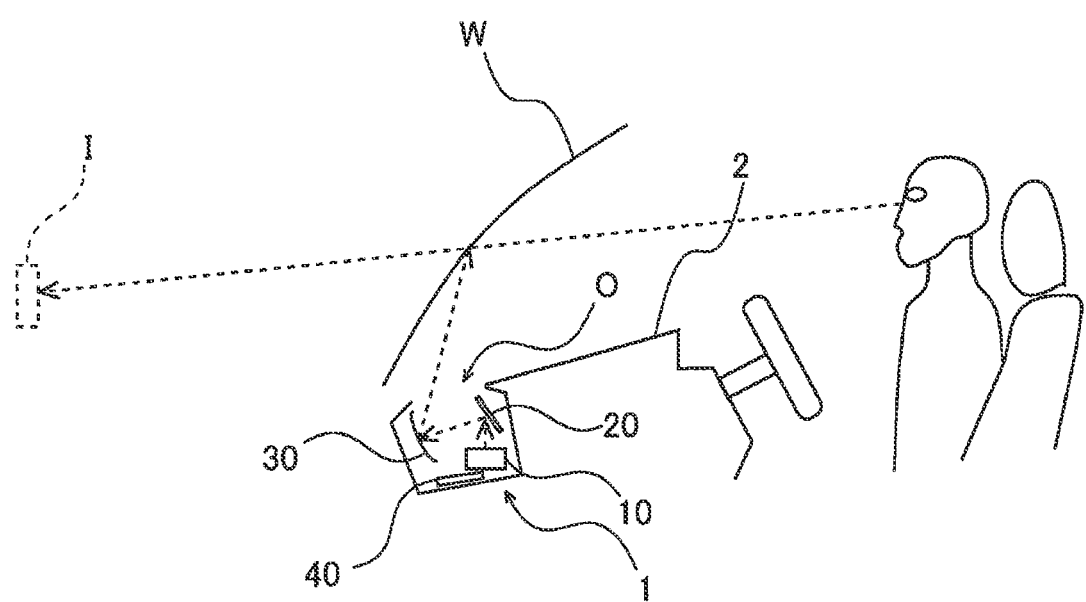
FIG. 1 is a schematic side view showing a head-up display device according to an embodiment of the present disclosure.

FIG. 1 is a schematic side view showing a head-up display device according to an embodiment of the present disclosure. As shown in FIG. 1, a head-up display device 1 according to the present embodiment is housed in an opening O formed in an upper face of an instrument panel 2 of a vehicle. As shown in FIG. 1, the head-up display device 1 includes an indicator 10, a reflecting mirror 20, and a concave mirror (mirror member) 30.

The indicator 10 emits information to be provided to a driver as display light. The display light from the indicator 10 is emitted toward the reflecting mirror 20 and is reflected by the reflecting mirror 20 toward the concave mirror 30. The concave mirror 30 reflects the display light and projects a display image onto a windshield W of the vehicle. The display image projected onto the windshield W is recognized by the driver as a virtual image I.

Here, the concave mirror 30 includes rotation shaft 32 (see FIG. 3) and is configured to rotate about the rotation shaft 32. The head-up display device 1 includes a control board (control unit) 40. When an operation signal or the like generated by a switch operation (operation) from the driver (user) is input, the control board 40 rotates the concave mirror 30 about the rotation shaft 32 based on the operation signal or the like. When the concave mirror is rotated, a projection position (height position) of the display image on the windshield W changes.

Figure 2:
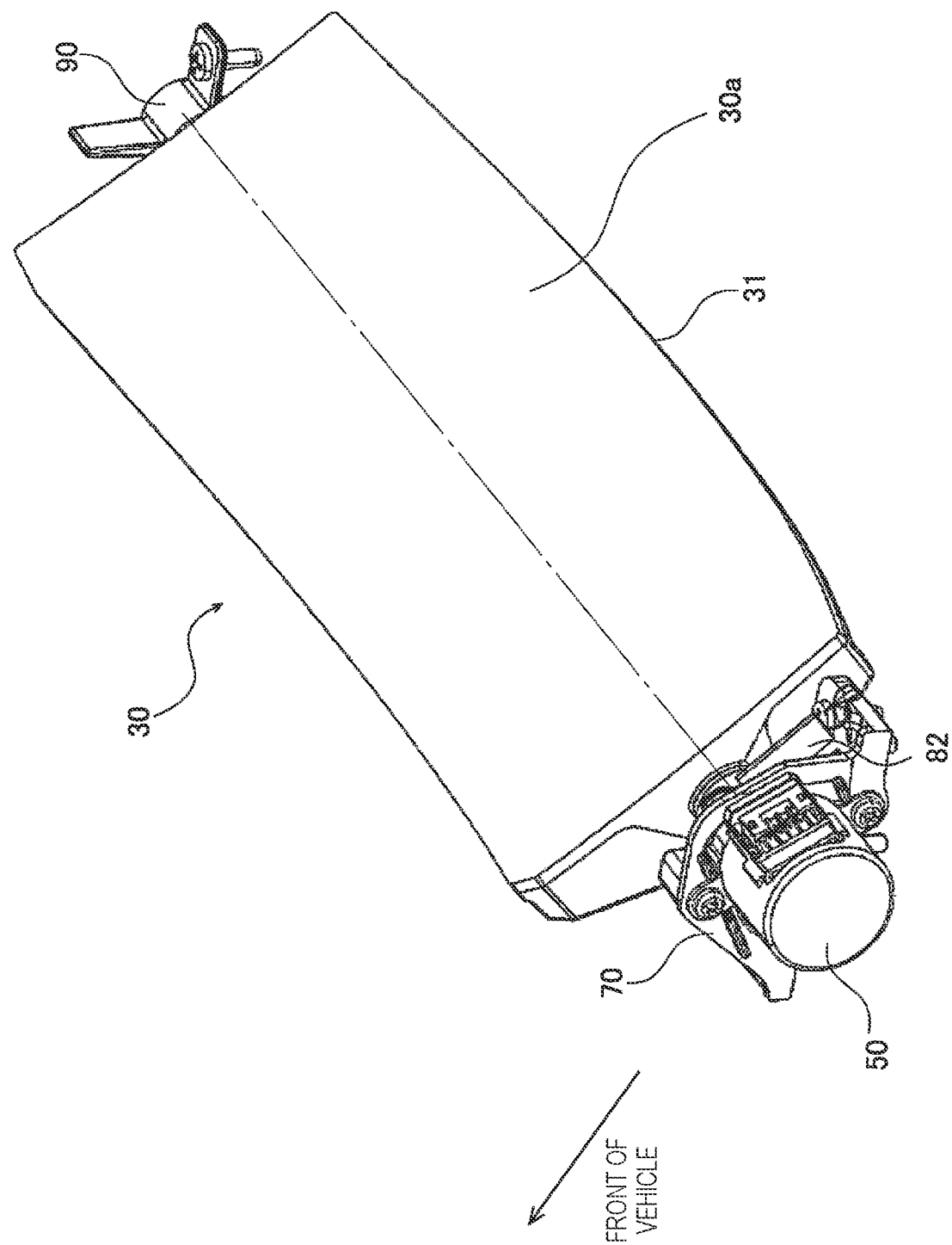
FIG. 2 is a perspective view showing a partial configuration of the head-up display device according to the present embodiment.
Figure 3:
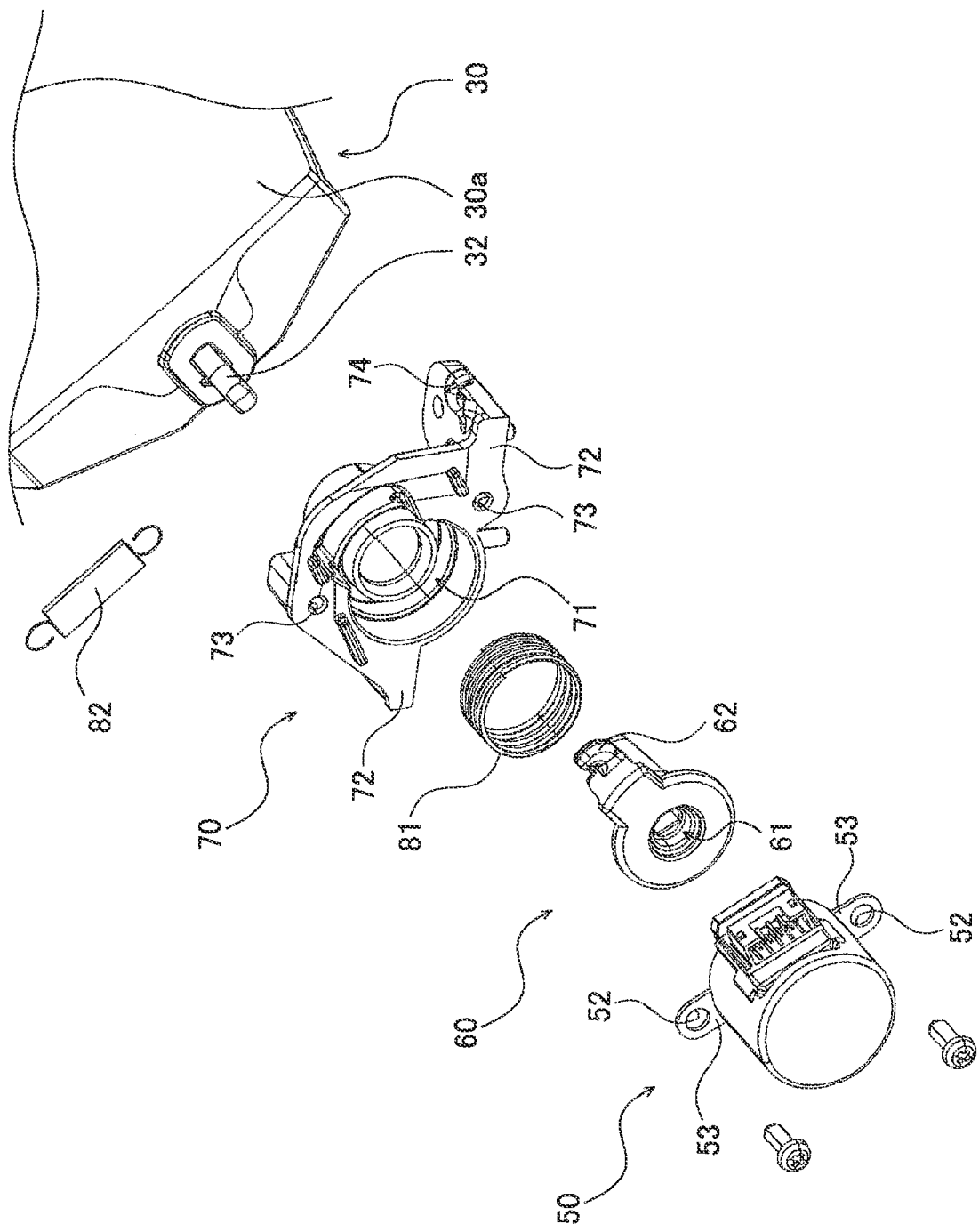
FIG. 3 is an exploded perspective view of the configuration shown in FIG. 2.

FIG. 2 is a perspective view showing a partial configuration of the head-up display device 1 according to the present embodiment, and FIG. 3 is an exploded perspective view of the configuration shown in FIG. 2. As shown in FIGS. 2 and 3, the concave mirror 30 includes a mirror main body 31 having a horizontally long reflecting surface 30a whose longitudinal direction is a vehicle width direction. The reflecting surface 30a of the mirror main body 31 forms a curved surface that is convex toward the front of the vehicle. The concave mirror 30 has the rotation shaft 32 at both ends in the longitudinal direction. FIG. 3 shows only the rotation shaft 32 on one end. The concave mirror 30 is configured to rotate about the rotation shaft 32, that is, about a one-dot chain line shown in FIG. 2.

The head-up display device 1 further includes a motor 50, a connecting member 60, a motor holder 70, springs 81 and 82, and a bearing member 90 in addition to the concave mirror 30.

The motor 50 shown in FIG. 3 controls the rotation of a shaft portion 51 (see FIG. 4) based on an instruction from the control board 40. In the present embodiment, the motor 50 is, for example, a stepping motor. The motor 50 includes the shaft portion 51 coaxial with the rotation shaft 32 of the concave mirror 30. The shaft portion 51 protrudes toward the concave mirror 30 and is inserted into an insertion hole 61 of the connecting member 60. When the shaft portion 51 is inserted into the insertion hole 61, the shaft portion 51 is connected to the connecting member 60 and can transmit rotational torque generated during rotation control to the connecting member 60.

The connecting member 60 is interposed between the shaft portion 51 of the motor 50 and the rotation shaft 32 of the concave mirror 30, and connects the shaft portion 51 and the rotation shaft 32. The connecting member 60 connects the shaft portion 51 and the rotation shaft 32, so that the concave mirror 30 can rotate at the same rotation angle as a rotation angle of the shaft portion 51.

The motor holder 70 includes a cylindrical portion 71 to which the motor 50 is fixed and into which the connecting member 60 is inserted. Specifically, the motor 50 includes two fixing pieces 53 each having a through hole 52. The motor holder 70 includes a plate portion 72 extending in a radial direction of the cylindrical portion 71, and two through holes 73 are formed at predetermined portions of the plate portion 72. The motor 50 is fixed to the motor holder 70 by screwing with the through holes 52 and 73 aligned. The motor holder 70 is fixed to, for example, a casing (not shown) constituting the head-up display device 1 by appropriate means.

The first spring 81 is a coil spring that is interposed in a compressed state between the cylindrical portion 71 of the motor holder 70 and the connecting member 60. The first spring 81 biases the connecting member 60 toward the motor 50. Therefore, the concave mirror 30 connected to the connecting member 60 is also biased toward the motor 50, thereby preventing rattling.

The second spring 82 is a coil spring that is hooked in an extended state between a hook portion 74 formed in the motor holder 70 and a hook portion 62 formed in the connecting member 60, and has a role of reducing clearance in a rotation direction of the concave mirror 30.

The bearing member 90 shown in FIG. 2 rotatably supports the rotation shaft 32 provided on the side of the concave mirror 30 opposite to the side on which the motor 50 is provided. Similarly to the motor holder 70, the bearing member 90 is also fixed to the casing (not shown) constituting the head-up display device 1 by appropriate means.

Figure 4:
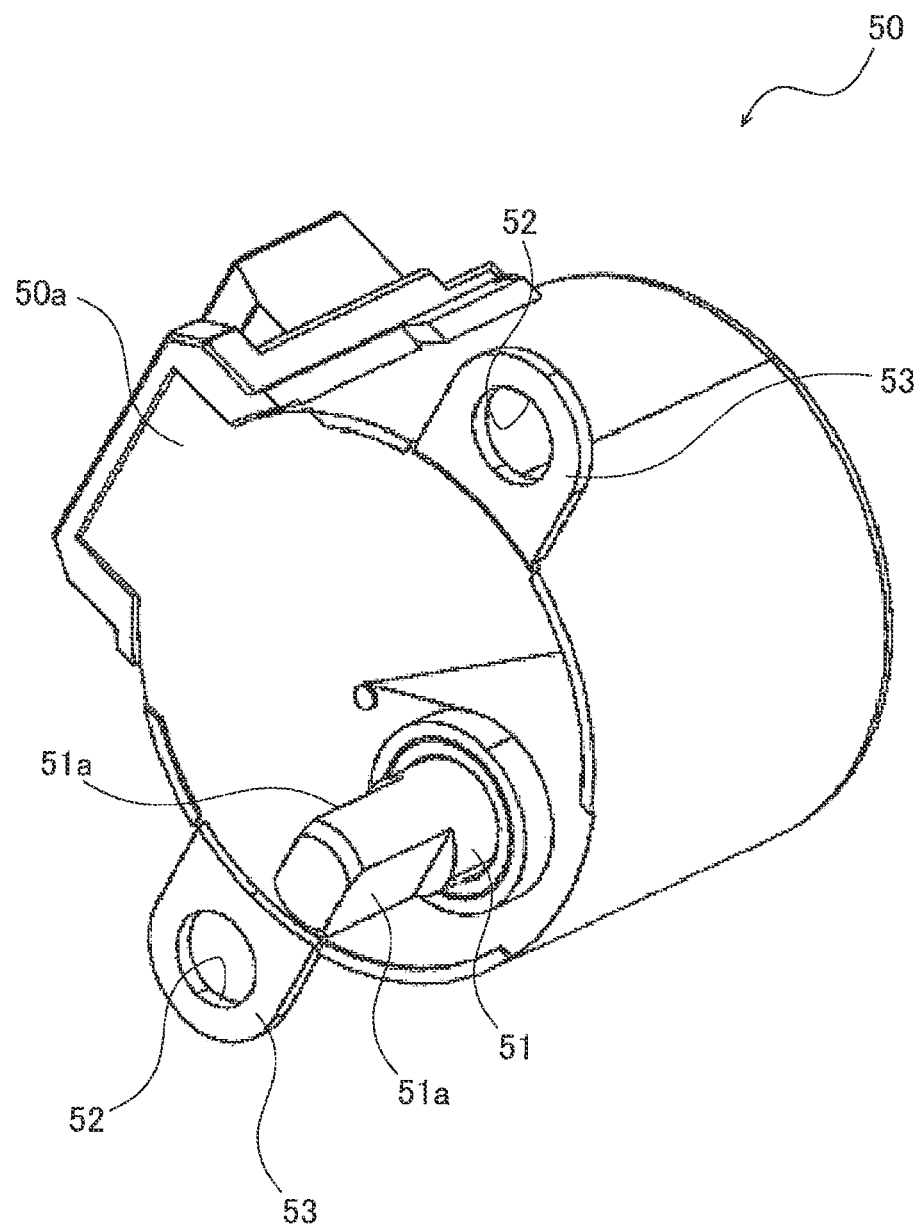
FIG. 4 is a perspective view of a motor shown in FIGS. 2 and 3.

Next, the components shown in FIGS. 2 and 3 will be described in detail. FIG. 4 is a perspective view of the motor 50 shown in FIGS. 2 and 3. As shown in FIG. 4, the shaft portion 51 protrudes from a bottom surface 50a of the motor 50. The shaft portion 51 has a cylindrical base. A tip of the shaft portion 51 has a shaved surface 51a formed by partially scraping off a cylindrical side face. Two shaved surfaces 51a are formed facing each other with a central axis of the shaft portion 51 interposed therebetween. Therefore, the tip of the shaft portion 51 has a substantially rectangular shape in a cross-sectional view.

Figure 5:
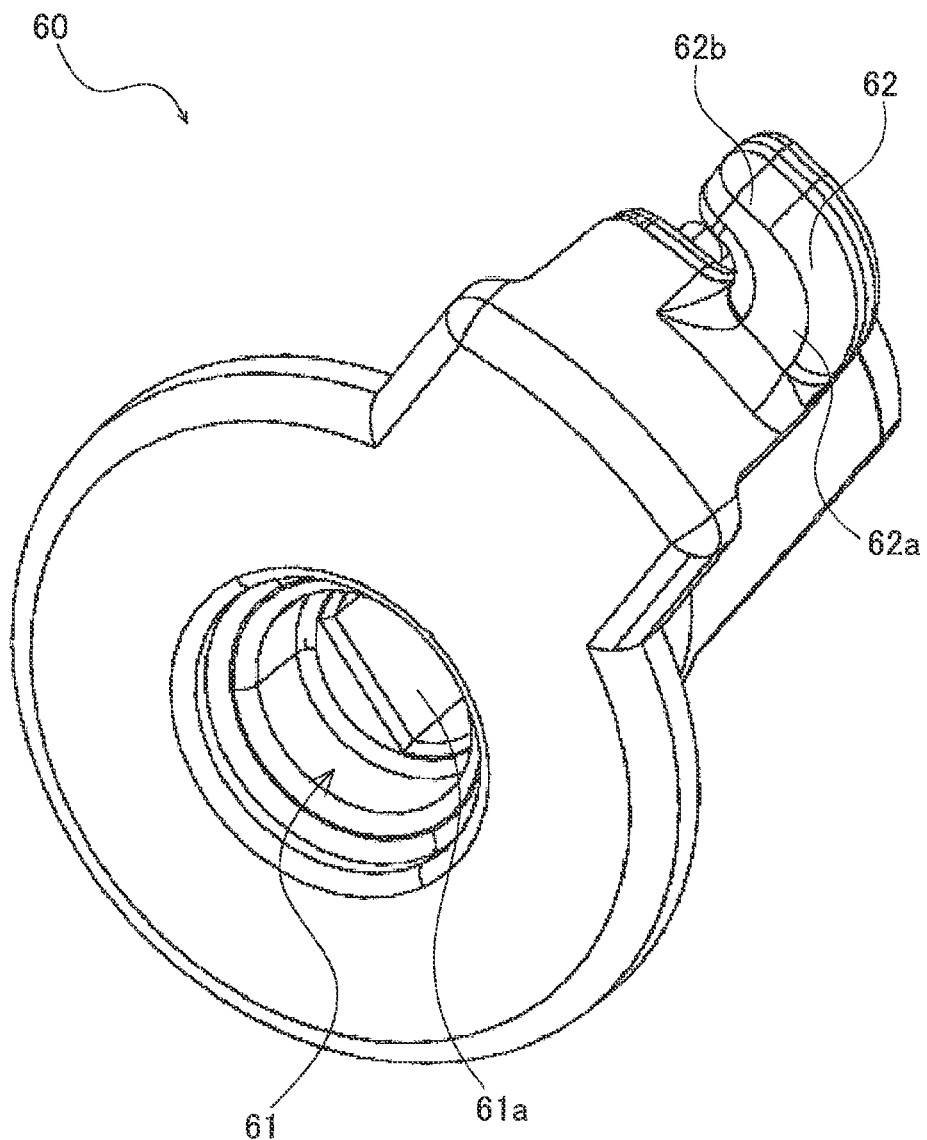
FIG. 5 is a first perspective view of a connecting member shown in FIGS. 2 and 3.
Figure 6:
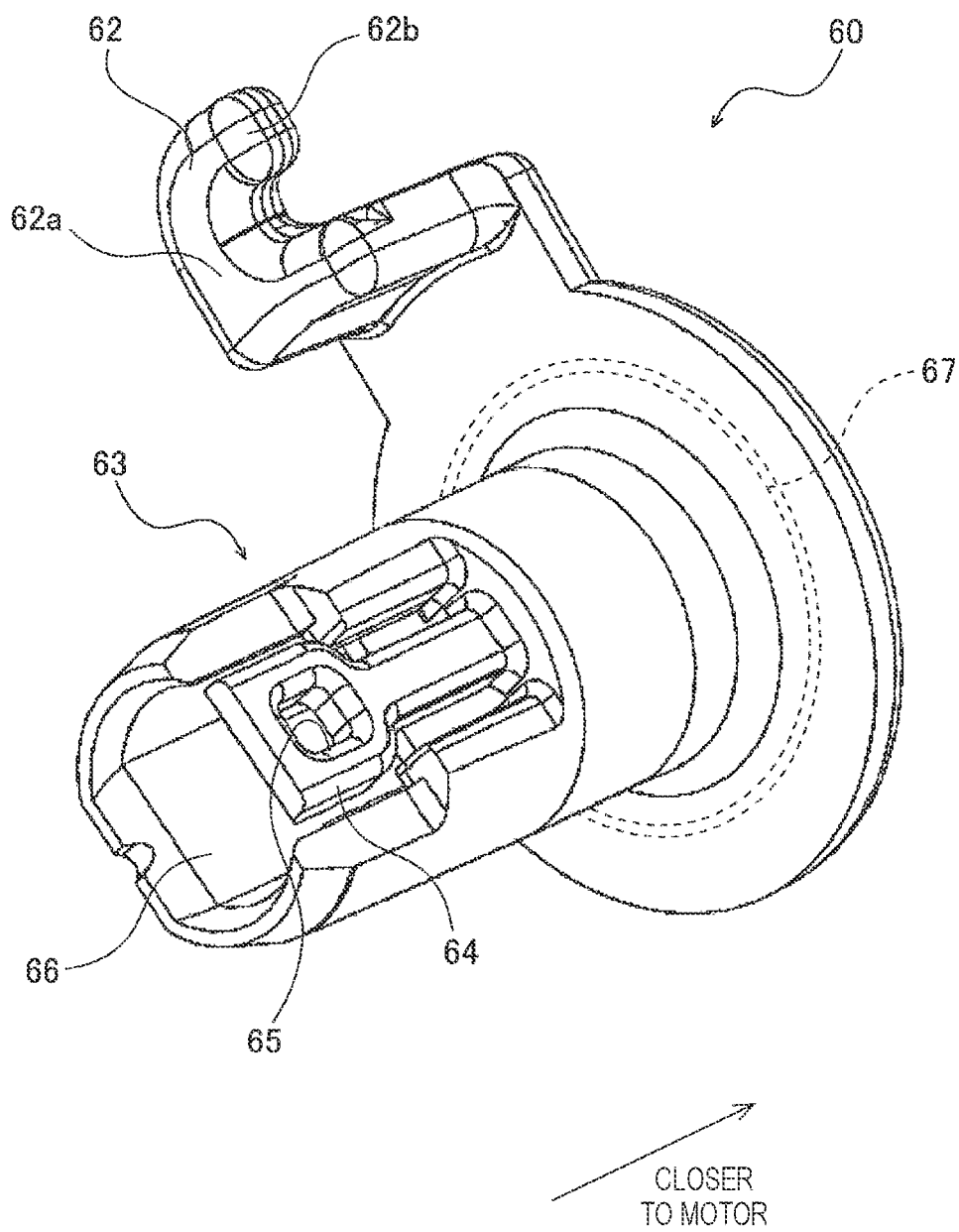
FIG. 6 is a second perspective view of the connecting member shown in FIGS. 2 and 3.

FIGS. 5 and 6 are perspective views of the connecting member 60 shown in FIGS. 2 and 3. As shown in FIG. 5, the connecting member 60 has the insertion hole 61 into which the shaft portion 51 is inserted. A shape of the insertion hole 61 is formed such that the insertion hole 61 has a flat surface portion 61a with which the shaved surface 51a at the tip of the shaft portion 51 matches. The flat surface portion 61a comes into contact with the shaved surface 51a when the shaft portion 51 rotates, and receives the rotational torque from the shaft portion 51.

As shown in FIG. 6, the connecting member 60 includes an insertion portion 63 that is inserted into the cylindrical portion 71 of the motor holder 70. The insertion portion 63 has a substantially cylindrical shape, and the rotation shaft 32 is inserted into the insertion portion 63. A part of a cylindrical wall of the insertion portion 63 is configured as an arm portion 64. The arm portion 64 has a cantilever shape connected to a base of the insertion portion 63, that is, closer to the motor 50, and has a locking hole 65 formed at a tip thereof. A locking protrusion 32a (see FIG. 9) of the rotation shaft 32, which will be described later, is fitted into the locking hole 65. Further, a peripheral portion 67 (see a broken line in FIG. 6) at the base of the insertion portion 63 is a portion where one end of the first spring 81 comes into contact.

The hook portion 62 is positioned on an outer side in a radial direction of the insertion portion 63. The hook portion 62 has a hook-shaped structure having a base portion 62a extending along the radial direction and a tip portion 62b extending in a state of being bent at about 90° from the base portion 62a. One end of the second spring 82 is hooked by the hook-shaped portion.

Figure 7:
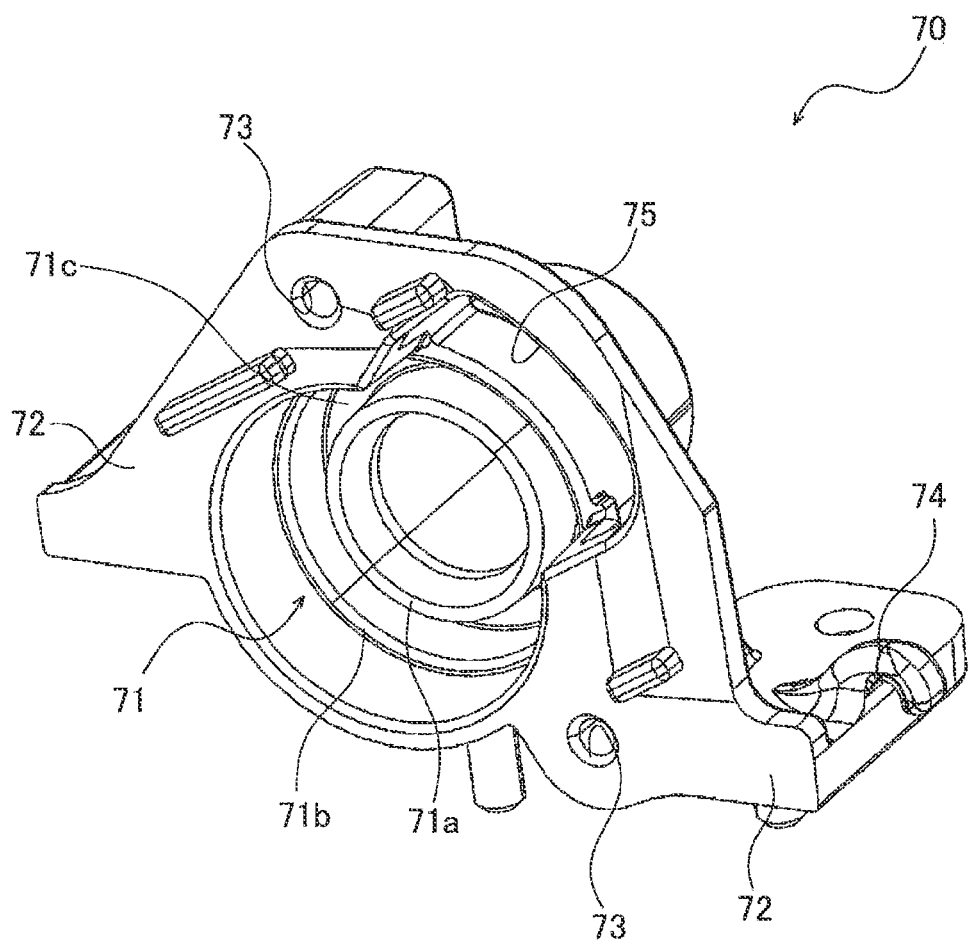
FIG. 7 is a first perspective view of a motor holder shown in FIGS. 2 and 3.
Figure 8:
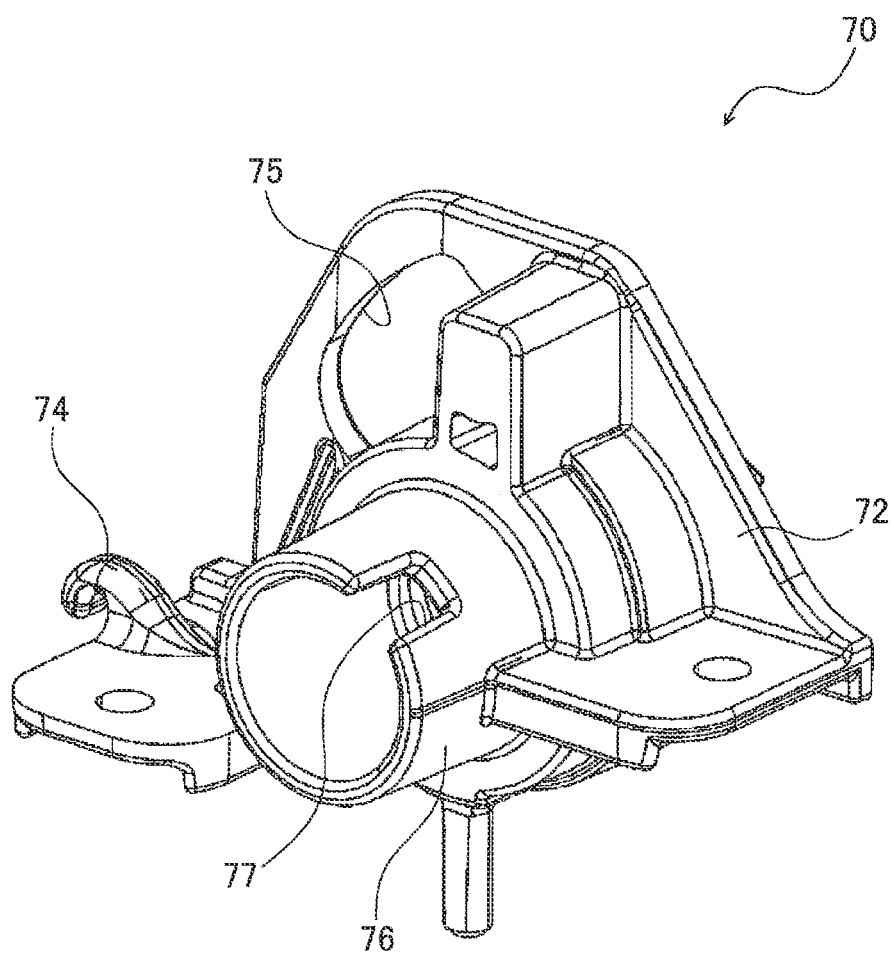
FIG. 8 is a second perspective view of the motor holder shown in FIGS. 2 and 3.

FIGS. 7 and 8 are perspective views of the motor holder 70 shown in FIGS. 2 and 3. As shown in FIG. 7, the cylindrical portion 71 of the motor holder 70 includes an inner cylindrical portion 71a and an outer cylindrical portion 71b. The insertion portion 63 of the connecting member 60 shown in FIG. 6 is inserted into the inner cylindrical portion 71a. The cylindrical portion 71 has a bottom wall 71c that connects the inner cylindrical portion 71a and the outer cylindrical portion 71b. The first spring 81 is disposed between the inner cylindrical portion 71a and the outer cylindrical portion 71b, and biases the connecting member 60 toward the motor 50 by being pressed by the bottom wall 71c.

An opening 75 is formed in the plate portion 72 of the motor holder 70 at a position near the cylindrical portion 71. The opening 75 allows the hook portion 62 to pass therethrough in a state where the insertion portion 63 of the connecting member 60 is inserted into the cylindrical portion 71. When the connecting member 60 and the motor holder 70 are assembled, the hook portion 62 passes through the opening 75 and is positioned closer to the concave mirror 30 than the plate portion 72.

As shown in FIG. 8, the motor holder 70 includes a contact cylindrical portion 76. The contact cylindrical portion 76 is a cylindrical body formed to be continuous with the inner cylindrical portion 71a, and a tip end thereof comes into contact with a contact portion 33 (see FIG. 9) on a side face of the concave mirror 30. A part of the tip end of the contact cylindrical portion 76 is cut out to form a notch portion 77. The notch portion 77 is a portion where the arm portion 64 (see FIG. 6) and the locking protrusion 32a (see FIG. 9) are positioned in an assembled state shown in FIG. 2.

Figure 9:
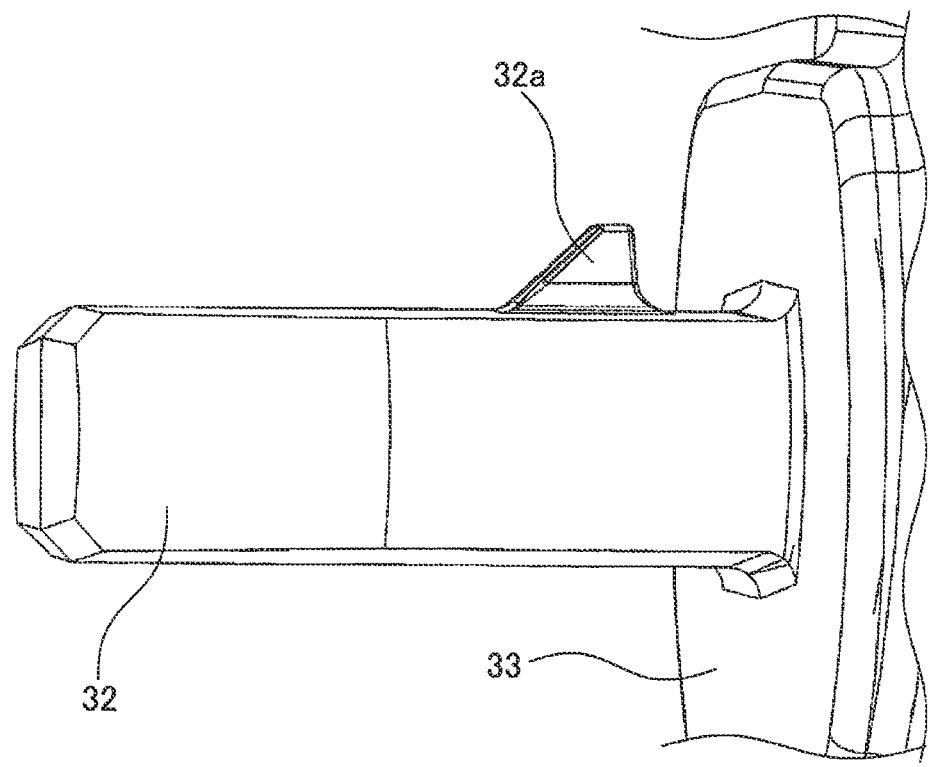
FIG. 9 is an enlarged perspective view of the vicinity of a rotation shaft of a concave mirror shown in FIG. 3.

FIG. 9 is an enlarged perspective view of the vicinity of the rotation shaft 32 of the concave mirror 30 shown in FIG. 3. As shown in FIG. 9, the concave mirror 30 has the contact portion 33 whose height is one step different from the side face of the concave mirror 30. The rotation shaft 32 protrudes from the center of the contact portion 33. As described above, the contact portion 33 is a portion with which the contact cylindrical portion 76 of the motor holder 70 comes into contact.

The rotation shaft 32 has a substantially rectangular parallelepiped shape. As shown in FIG. 6, the insertion portion 63 has a flat surface portion 66 whose inner wall coincides with one surface of the rotation shaft 32 having a substantially rectangular parallelepiped shape. Therefore, the rotational torque of the motor 50 is transmitted to the rotation shaft 32 via the flat surface portion 66 of the connecting member 60.

Further, as shown in FIG. 9, the locking protrusion 32a is formed on one surface of the rotation shaft 32. The locking protrusion 32a has an inclined surface closer to the motor 50, and is fitted into the locking hole 65 of the arm portion 64 when the rotation shaft 32 is inserted into the insertion portion 63. By fitting the locking protrusion 32a into the locking hole 65, the rotation shaft 32 is prevented from falling off from the connecting member 60.

Figure 10:
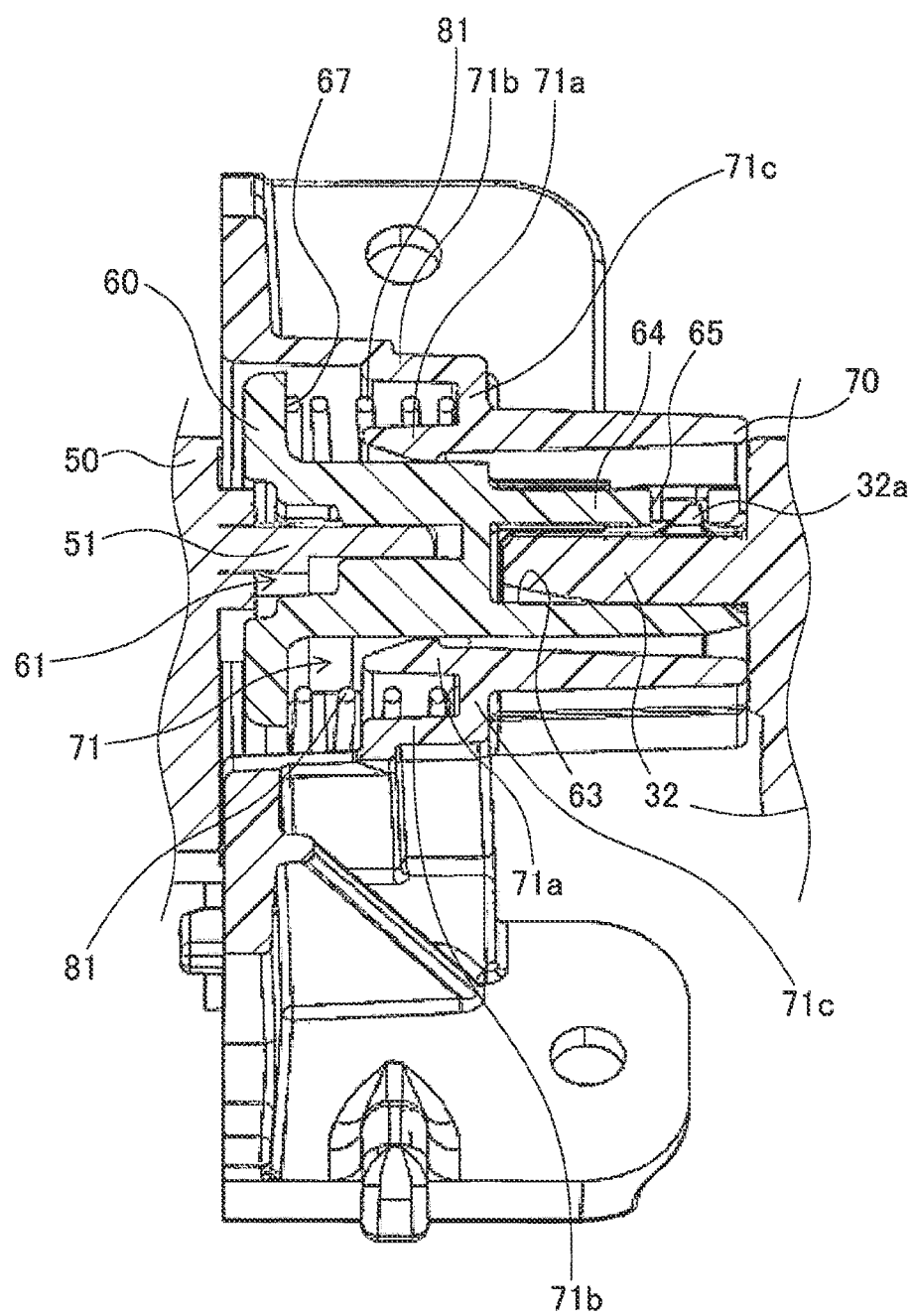
FIG. 10 is a cross-sectional view including the vicinity of the connecting member in an assembled state.

FIG. 10 is a cross-sectional view including the vicinity of the connecting member 60 in the assembled state. As shown in FIG. 10, the shaft portion 51 of the motor 50 is inserted into the insertion hole 61 of the connecting member 60 and connected. The connecting member 60 is inserted into the cylindrical portion 71 of the motor holder 70. The first spring 81 is in the compressed state with the one end in contact with the peripheral portion 67 at the base of the connecting member 60 and the other end in contact with the bottom wall 71c connecting the inner cylindrical portion 71a and the outer cylindrical portion 71b. In the assembled state, the rotation shaft 32 is fitted into the insertion portion 63 of the connecting member 60, and the locking protrusion 32a is locked in the locking hole 65 of the arm portion 64.

In the assembled state as described above, the rotation shaft 32 is rotated by the same rotation angle as that of the shaft portion 51 of the motor 50, and the concave mirror 30 can be rotated at a high speed without being affected by a reduction ratio. In addition, it is not necessary to rotate the shaft portion 51 at a high speed, and a driving noise can be reduced.

Figure 11A:
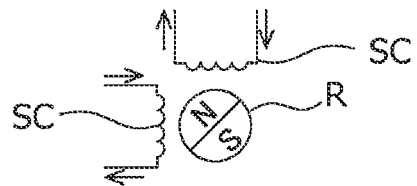
FIG. 11A is conceptual diagrams showing an example of an electrical structure of the motor, and shows a first rotation position.
Figure 11B:
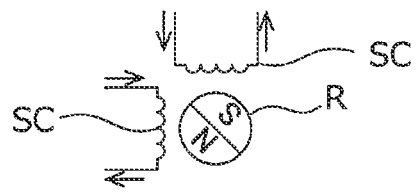
FIG. 11B is conceptual diagrams showing an example of an electrical structure of the motor, and shows a second rotation position.
Figure 11C:
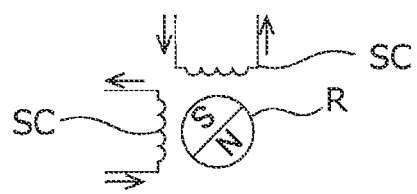
FIG. 11C is conceptual diagrams showing an example of an electrical structure of the motor, and shows a third rotation position.
Figure 11D:
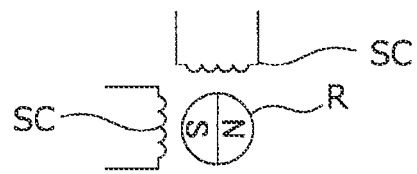
FIG. 11D is conceptual diagrams showing an example of an electrical structure of the motor, and shows a fourth rotation position.

Next, a drive method of the head-up display device 1 according to the present embodiment will be described, but prior to this, an electrical structure of the motor 50 will be described. FIGS. 11A-11D are conceptual diagrams showing an example of the electrical structure of the motor 50. FIG. 11A shows a first rotation position, FIG. 11B shows a second rotation position, FIG. 11C shows a third rotation position, and FIG. 11D shows a fourth rotation position.

As shown in FIGS. 11A-11D, the motor 50 includes a rotor R that is connected to the shaft portion 51 and rotationally operates, and a plurality of stator coils SC that are energized to rotate the rotor R. Each of the stator coils SC can be energized in a positive direction from one end to the other end of a coil and energized in a negative direction from the other end to the one end of the coil. The rotor R is implemented by a permanent magnet. Therefore, the motor 50 can rotate the rotor R by sequentially switching the energized state of each of the stator coils SC.

Here, the motor 50 can stabilize the rotation position of the rotor R by holding torque by maintaining the energized state of the stator coils SC in the same state. For example, the motor 50 can stabilize the rotor R at the rotation position shown in FIG. 11A by the holding torque by maintaining an energized state shown in FIG. 11A. Similarly, the motor 50 can stabilize the rotor R at the rotation position shown in FIG. 11B by the holding torque by maintaining an energized state shown in FIG. 11B. Such positions where the rotation of the rotor R is stabilized are referred to as electrically stable points.

In addition, in the motor 50, the rotation position of the rotor R is stabilized by detent torque when the stator coil SC is not energized. Specifically, when the plurality of stator coils SC are not energized, since the rotor R is a permanent magnet, the rotor R is pulled by the stator coil SC (one of the stator coils SC) which is a metal member. As a result, the rotation position of the rotor R is stabilized, for example, as shown in FIG. 11D. Such a position where the rotation of the rotor R is stabilized is referred to as a mechanically stable point.

Figure 12:
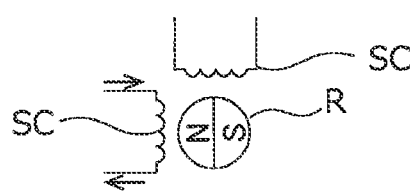
FIG. 12 is a conceptual diagram illustrating a drive method of the head-up display device according to the present embodiment.

Next, the drive method of the head-up display device 1 according to the present embodiment will be described. FIG. 12 is a conceptual diagram illustrating the drive method of the head-up display device 1 according to the present embodiment. With regard to the driving of the motor 50, a drive method of controlling the rotation by energizing the stator coils SC in the order of an excited state shown in FIG. 11A, an excited state shown in FIG. 11B, and an excited state shown in FIG. 11C is referred to as full-step drive.

In the head-up display device 1 according to the present embodiment, the drive method of the motor 50 is half-step drive or micro-step drive. The half-step drive is a drive method in which, for example, an excited state shown in FIG. 12 is interposed between the excited state shown in FIG. 11A and the excited state shown in FIG. 11B. The half-step drive enables finer control of the rotation position than the full-step drive. The micro-step drive is a drive method in which the rotation position of the rotor R is controlled in one or more excited states between the excited state shown in FIG. 11A and the excited state shown in FIG. 12, for example, by controlling an energization amount to each of the stator coils SC. The micro-step drive enables finer control of the rotation position than the half-step drive.

That is, in the head-up display device 1 according to the present embodiment, the drive method of the motor 50 is the half-step drive or the micro-step drive, and by performing fine control of the rotation position, it is possible to improve the resolution when the concave mirror 30 is rotated.

Further, the head-up display device 1 according to the present embodiment stops the rotor R only at the mechanically stable point when stopping the motor 50. That is, since the control board 40 does not stop the rotor R at the electrically stable point or the like, after the rotor R is stopped, the energization to the stator coil SC can be cut off, which can lead to reduction of power consumption and reduction of the burden on the motor due to heat generation or the like.

In addition, in the head-up display device 1 according to the present embodiment, heat countermeasures are taken for the indicator 10, and a rotation angle, for example, a parking position (hereinafter, referred to as a PP position) is set at which the amount of the sunlight that enters the indicator 10 through the concave mirror 30 is less than or equal to a predetermined amount of light. That is, the PP position is set such that the amount of light is equal to or less than the predetermined amount of light so that the indicator 10 does not fail due to direct light from the sun that enters the concave mirror 30 through the windshield W and reaches the indicator 10. Therefore, the control board 40 moves the concave mirror 30 to the PP position when it can be determined that a temperature of the indicator 10 is high.

Further, in the present embodiment, the control board 40 sets a first rotation speed when moving the concave mirror 30 to the PP position and when moving the concave mirror from the PP position to be higher than a second rotation speed of the concave mirror 30 in a normal situation. Here, the normal situation refers to when moving the concave mirror 30 by an operation of the user and when moving the concave mirror 30 in conjunction with a seat memory. The conjunction with the seat memory is a function in which a seat position and a height of the virtual image I are set in advance by the user, when an ignition switch is turned on or an instruction is given from the user, the seat position is moved, and the concave mirror is rotated such that the height of the virtual image I becomes a set height. The seat position is a front-rear position or a height position of a seat. In this way, by moving the concave mirror 30 to and from the PP position faster than normal times, it is possible to quickly take a failure prevention measure when the indicator 10 reaches a high temperature, and to quickly provide a virtual image to the user when the temperature of the indicator 10 is low. In addition, since the concave mirror 30 is not rotated at a high speed by the operation of the user, fine adjustment of the height of the virtual image can be easily performed.

Figure 13:
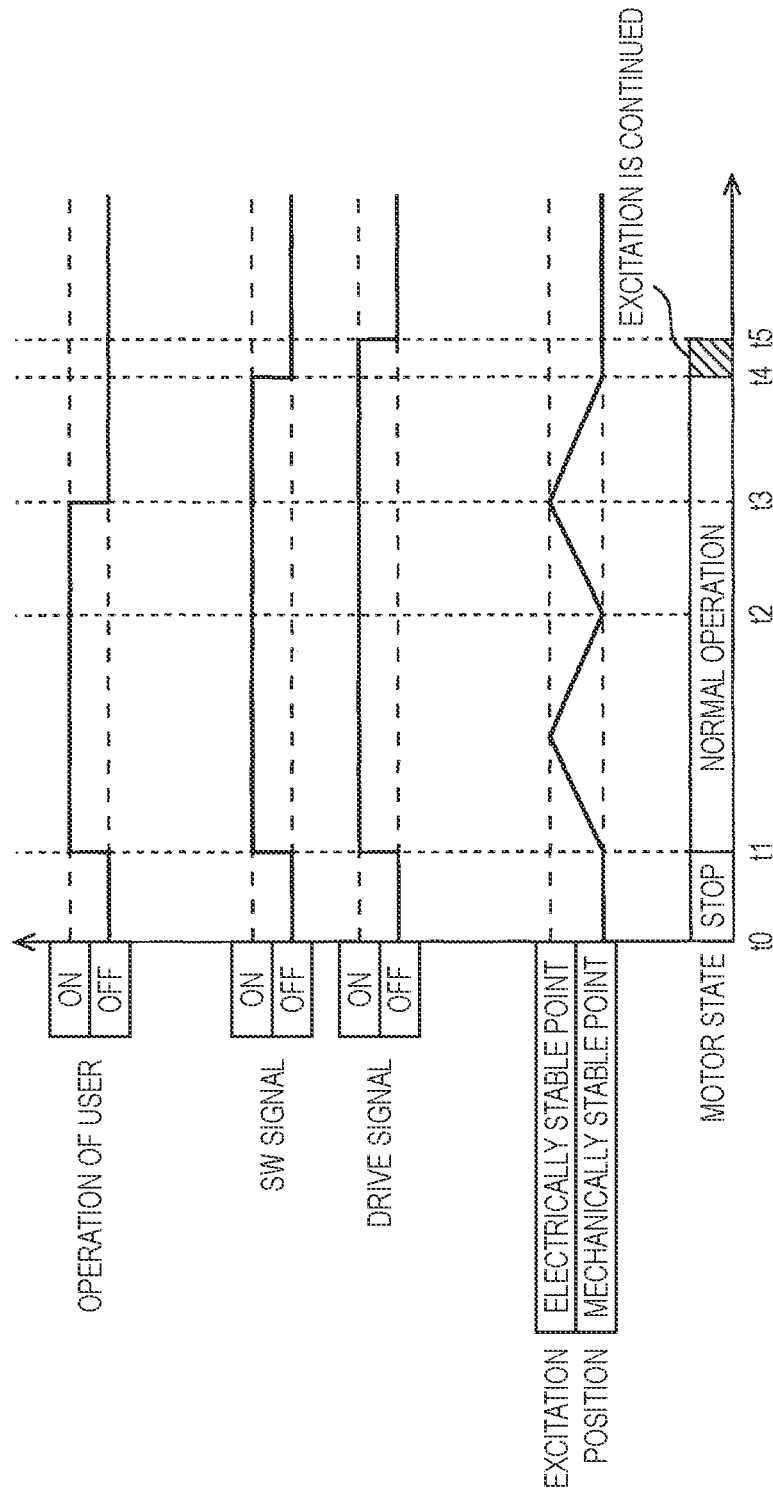
FIG. 13 is a timing chart showing the drive method of the head-up display device according to the present embodiment.

Next, an operation of the head-up display device 1 corresponding to the operation of the user will be described. FIG. 13 is a timing chart showing the drive method of the head-up display device 1 according to the present embodiment. FIG. 13 shows the drive method in the half-step drive, but the same applies to the micro-step drive.

First, at time t0 shown in FIG. 13, it is assumed that there is no switch operation by the user (off state), that is, no operation signal is input. In this case, a switch signal, that is, a signal to rotate the rotor R is off, and a drive signal, that is, a signal indicating the presence or absence of energization is also off. Therefore, the control board 40 does not operate the motor 50, and a motor state of the motor 50 is a stop state. In the present embodiment, since the rotor R is stopped at the mechanically stable point, an excitation position at time t0 is the mechanically stable point.

Next, it is assumed that the switch operation by the user is turned on at time t1. Accordingly, the switch signal and the drive signal are turned on, and the control board 40 performs energization control to rotate the rotor R. In particular, when the switch operation is turned on at time t1, the control board 40 determines to operate the rotor R from the current mechanically stable point to the next mechanically stable point in the rotation direction. Therefore, the excitation position passes through the electrically stable point and reaches the next mechanically stable point at time t2. The motor state during this period is a normal operation state.

At time t2, the switch operation by the user remains in on state. Therefore, similarly to the above, the control board 40 determines to operate the rotor R to the next mechanically stable point in the rotation direction at time t2 as described above. Therefore, the excitation position passes through the electrically stable point and reaches the next mechanically stable point at time t4.

At time t3 before reaching the next mechanically stable point at time t4, the switch operation by the user is turned off. However, since the control board 40 determines to rotate the rotor R to the next mechanically stable point at time t2, the switch signal and the drive signal continue to be in on state.

At time t4, the control board 40 turns off the switch signal. On the other hand, the control board 40 does not turn off the drive signal and continues to be in on state of the drive signal for a predetermined time from time t4 when the rotor R reaches the mechanically stable point. That is, energization is performed for a predetermined time to stabilize the rotor R at this mechanically stable point. At time t5 when a predetermined time elapses from time t4, the drive signal is also turned off.

In this way, the head-up display device 1 according to the present embodiment includes the motor 50 in which the shaft portion 51 is disposed coaxially with the rotation shaft 32 of the concave mirror 30, and the connecting member 60 that connects the shaft portion 51 of the motor 50 and the rotation shaft 32 of the concave mirror 30 and rotates the concave mirror 30 at the same rotation angle as the rotation angle of the shaft portion 51. Therefore, it is not necessary to provide a worm gear for rotating the concave mirror 30, and it is possible to prevent a situation in which it is difficult to rotate the concave mirror 30 at a high speed due to an increase in the reduction ratio. There is a concern that the resolution may decrease when the concave mirror 30 is rotated at a high speed, but since the rotation of the motor 50 is controlled by the half-step drive or the micro-step drive, it is possible to suppress a decrease in the resolution during mirror rotation. In addition, it is not necessary to increase the energization amount for high-speed movement, and the driving noise is reduced. Therefore, according to the head-up display device 1, it is possible to reduce the driving noise and enable high-speed movement while suppressing a decrease in the resolution during mirror rotation.

The head-up display device 1 stops the rotor R only at the mechanically stable point when stopping the motor 50. Therefore, the control board 40 does not stop the rotor R at the electrically stable point or the like, after the rotor R is stopped, the energization to the stator coil SC can be cut off, which can lead to reduction of power consumption and reduction of the burden on the motor 50 due to heat generation or the like.

The rotor R is rotated to the mechanically stable point, and for example, this prevents the rotation of the rotor R from stopping at a location other than the mechanically stable point and then the rotor R rotating to the mechanically stable point due to the detent torque when energization is turned off. Therefore, it is possible to prevent a control position and a mechanical position from not matching each other.

After the rotor R is rotated to the next mechanically stable point, the energized state is maintained for a predetermined time. Therefore, after the rotor R reaches the mechanically stable point, it is possible to prevent vibrations in which the rotor R reciprocates around the mechanically stable point due to the energization being stopped when a rotational force is not subsided.

The control board 40 sets the first rotation speed when moving the concave mirror to the PP position and when moving the concave mirror 30 from the PP position to be higher than the second rotation speed of the concave mirror 30 in normal times. Therefore, it is possible to quickly take a failure prevention measure when the indicator 10 reaches a high temperature, and to quickly provide a virtual image to the user when the temperature of the indicator 10 is low.

Although the present disclosure has been described above based on the embodiment, the present disclosure is not limited to the embodiment described above, and modifications may be made without departing from the gist of the present disclosure, or publicly known or well-known techniques may be appropriately combined.

For example, in the present embodiment, the shaft portion 51 of the motor 50 and the rotation shaft 32 of the concave mirror 30 are connected by one connecting member 60, but the connecting member 60 is not particularly limited to one, and may include two or more members.

Further, the head-up display device 1 according to the present embodiment includes the concave mirror 30, but the present disclosure is not limited thereto, and the head-up display device 1 may include a mirror with an uneven surface or a convex surface as long as the mirror reflects display light and projects a display image. In the present embodiment, the springs 81 and 82 are provided from the viewpoint of preventing rattling, but the positions of the springs 81 and 82 are not limited to those described above. If possible, other types of elastic members such as dampers may be used instead of the springs 81 and 82.

In addition, the number of stator coils SC is two in the example shown in FIGS. 11A-11D, but the number of stator coils SC is not particularly limited to two. A multipolar permanent magnet may be used for the rotor R.

Further, an example in which the energization is turned off after the excitation is continued for a predetermined time at the mechanically stable point has been described above with reference to FIG. 13, but the excitation for the predetermined time is not limited to the case where the motor 50 is operated by the operation of the user. The excitation for the predetermined time is preferably performed when moving the concave mirror 30 to the PP position, when moving the concave mirror 30 from the PP position, or when moving the concave mirror 30 in conjunction with the seat memory.

Further, in the above embodiment, when moving the concave mirror 30 to the PP position and when moving the concave mirror 30 from the PP position, the speed is increased compared to normal times, but the present disclosure is not limited thereto, and the speed may be increased compared to normal times only when moving the concave mirror 30 to the PP position or when moving the concave mirror 30 from the PP position. In addition, the normal times are the time when moving the concave mirror 30 by the operation of the user and the time when moving the concave mirror 30 in conjunction with the seat memory, but only one of them may correspond to the normal time.

Here, features of the embodiment of the head-up display device according to the present disclosure described above are briefly summarized and listed below in a first aspect to a sixth aspect.

According to the first aspect, a head-up display device (1) includes: an indicator (10) configured to emit display light; a mirror member (concave mirror 30) rotatable about a rotation shaft (32) and configured to reflect the display light from the indicator to project a display image; a motor (50) having a shaft portion (51) disposed coaxially with the rotation shaft of the mirror member and configured to rotate the shaft portion about an axis when energized; a connecting member (60) configured to connect the shaft portion of the motor and the rotation shaft of the mirror member and rotate the mirror member at the same rotation angle as a rotation angle of the shaft portion; and a control unit (control board 40) configured to control the motor. The control unit controls rotation of the motor by half-step drive or micro-step drive.

According to the second aspect, in the head-up display device of the first aspect, the motor has a rotor, and a plurality of mechanically stable points appear at which a position of the rotor is stabilized by detent torque when the motor is not energized. The control unit stops the rotor only at the mechanically stable points.

According to the third aspect, in the head-up display device of the first aspect, the motor has a rotor, and a plurality of mechanically stable points appear at which a position of the rotor is stabilized by detent torque when the motor is not energized. When the control unit receives an operation signal to rotate the mirror member generated by an operation of a user, the control unit determines to rotate the rotor to the next mechanically stable point in a rotation direction indicated by the operation signal.

According to the fourth aspect, in the head-up display device of the second aspect or the third aspect, when the rotor is stopped at a mechanically stable point, the control unit performs energization for a predetermined time to stabilize the rotor at the mechanically stable point and then stops the energization.

According to the fifth aspect, in the head-up display device of any one of the first aspect to the fourth aspect, the control unit sets a first rotation speed of the mirror member, which is in at least one of a case where the mirror member is moved to a rotation angle and a case where the mirror member is moved from the rotation angle at which amount of sunlight that enters the indicator through the mirror member is set on less than or equal to a predetermined amount of light, to be higher than a second rotation speed of the mirror member, which is in at least one of a case where the mirror member is rotated by an operation of a user and a case where the mirror member is rotated to a set position of the mirror member preset by the user.

According to a six aspect, a head-up display device (1) includes: a liquid crystal display (indicator 10) configured to emit display light; a reflecting mirror (20) configured to reflect the display light from the liquid crystal display; a concave mirror (30) rotatable about a rotation shaft (32) and configured to reflect the display light from the reflecting mirror toward a windshield of a vehicle to project a display image onto the windshield; a motor (50) having a shaft portion (51) disposed coaxially with the rotation shaft of the concave mirror and configured to rotate the shaft portion about an axis when energized; a connecting member (60) that connects the shaft portion of the motor and the rotation shaft of the concave mirror by being inserted from a side where the shaft portion and the rotation shaft face each other and configured to rotate the concave mirror at the same rotation angle as a rotation angle of the shaft portion; and a control unit (control board 40) configured to control the motor. The control unit controls rotation of the motor by half-step drive or micro-step drive.

Although various embodiments have been described above with reference to the drawings, it goes without saying that the present disclosure is not limited to these examples. It is apparent that those skilled in the art can come up with various modifications or corrections within the scope of the claims, and it is understood that the modifications or corrections naturally fall within the technical scope of the present disclosure. In addition, the components described in the above embodiments may be combined freely without departing from the spirit of the disclosure.

What is claimed is:

1. A head-up display device comprising:
an indicator configured to emit display light;
a mirror member rotatable about a rotation shaft and configured to reflect the display light from the indicator to project a display image;
a motor having a shaft portion disposed coaxially with the rotation shaft of the mirror member and configured to rotate the shaft portion about an axis when energized;
a connecting member configured to connect the shaft portion of the motor and the rotation shaft of the mirror member and rotate the mirror member at the same rotation angle as a rotation angle of the shaft portion; and
a control unit configured to control the motor, wherein
the control unit controls rotation of the motor by half-step drive or micro-step drive.

2. The head-up display device according to claim 1, wherein
the motor has a rotor, and a plurality of mechanically stable points appear at which a position of the rotor is stabilized by detent torque when the motor is not energized, and
the control unit stops the rotor only at the mechanically stable points.

3. The head-up display device according to claim 1, wherein
the motor has a rotor, and a plurality of mechanically stable points appear at which a position of the rotor is stabilized by detent torque when the motor is not energized, and
when the control unit receives an operation signal to rotate the mirror member generated by an operation of a user, the control unit determines to rotate the rotor to the next mechanically stable point in a rotation direction indicated by the operation signal.

4. The head-up display device according to claim 2, wherein
when the rotor is stopped at a mechanically stable point, the control unit performs energization for a predetermined time to stabilize the rotor at the mechanically stable point and then stops the energization.

5. The head-up display device according to claim 1, wherein
the control unit sets a first rotation speed of the mirror member, which is in at least one of a case where the mirror member is moved to a rotation angle and a case where the mirror member is moved from the rotation angle at which amount of sunlight that enters the indicator through the mirror member is set on less than or equal to a predetermined amount of light, to be higher than a second rotation speed of the mirror member, which is in at least one of a case where the mirror member is rotated by an operation of a user and a case where the mirror member is rotated to a set position of the mirror member preset by the user.

6. A head-up display device comprising:
a liquid crystal display configured to emit display light;
a reflecting mirror configured to reflect the display light from the liquid crystal display;
a concave mirror rotatable about a rotation shaft and configured to reflect the display light from the reflecting mirror toward a windshield of a vehicle to project a display image onto the windshield;
a motor having a shaft portion disposed coaxially with the rotation shaft of the concave mirror and configured to rotate the shaft portion about an axis when energized;
a connecting member that connects the shaft portion of the motor and the rotation shaft of the concave mirror by being inserted from a side where the shaft portion and the rotation shaft face each other and configured to rotate the concave mirror at the same rotation angle as a rotation angle of the shaft portion; and
a control unit configured to control the motor, wherein
the control unit controls rotation of the motor by half-step drive or micro-step drive.

* * * * *